United States Patent [19]

Neufang

[11] 3,970,794

[45] July 20, 1976

[54] PCM TIME-DIVISION MULTIPLEX TELECOMMUNICATION NETWORK

[75] Inventor: Karlheinz Neufang, Munich, Germany

[73] Assignee: Siemens Aktiengesellschaft, Munich, Germany

[22] Filed: Mar. 26, 1974

[21] Appl. No.: 454,851

[30] Foreign Application Priority Data

Mar. 29, 1973 Germany............................ 2315751

[52] U.S. Cl............................................ 179/15 AQ
[51] Int. Cl.[2] .................................... H04J 3/00
[58] Field of Search ........ 179/15 AQ, 15 AT, 15 A, 179/15 BA, 18 GF

[56] References Cited
UNITED STATES PATENTS 3,787,631 1/1974 Lewis .............................. 179/15 AT
3,840,707 10/1974 Hemdal .......................... 179/15 AQ Primary Examiner—Kathleen H. Claffy
Assistant Examiner—Joseph Popek
Attorney, Agent, or Firm—Schuyler, Birch, Swindler, McKie & Beckett

[57] ABSTRACT

The clock pulse supply in a PCM time-division having modular switching facilities within the switching centers is produced by a clock generator associated with the module which steps a time-slot counter that counts in a time sequence, remains stopped, or is backspaced such that it is capable of accessing the main store of the center as well as the address memories of said module.

1 Claim, 2 Drawing Figures

PCM TIME-DIVISION MULTIPLEX TELECOMMUNICATION NETWORK

BACKGROUND OF THE INVENTION

The invention relates to a PCM time-division multiplex communication network having a plurality of PCM time-division multiplex switching centers interconnected over four-wire time-division multiplex connections. In such telecommunication networks the time-division multiplex switching centers can be constructed such that they have stores allocated individually to each pair of conductors of the four-wire time-division multiplex highways for storing all elements of information during a pulse frame — determined by the duration of the sampling period of the time-division multiplex system — incoming on or to be transferred over the time-division multiplex connection concerned and associated with message time slots, as well as crosspoint elements for the space-division switching of the elements of information, and address memories. The address memories are used to achieve the space and time-division coordination of the operation of the crosspoint elements and of the store allocations of the stores allocated to the individual message time slots.

In a prior PCM time-division multiplex telecommunication network of this type (West German Examined Application No. 2,108,745), a number of switching time slots are provided on the link network interconnecting the crosspoint elements allocated to the individual time-division multiplex connections which exceed the number of communication channels incoming on or to be transferred over the four-wire time-division multiplex (e.g., 64). As a result, virtually no connections are lost on account of the absence of idle switching time slots.

The clock pulse supply for the main stores or for the transfer storages that may be inserted therebefore or thereafter, as necessary, as well as for the address memories, according to which incoming PCM data are written in or outgoing PCM data are read out in ordered fashion in accordance with message time slots; and an addressed accessing of the main stores and crosspoint elements, achieved through the address memories in accordance with the selected switching time slot, in particular if one utilizes the increased number of switching time slots as suggested above, involves technical complexity. Thus, for example, in the circuit arrangement according to West German Published Application No. 2,108,745, there are provided in the individual switching centers for each four-wire time-division multiplex connection a line counter operated by the system clock, which counts the incoming elements of information and causes the parallel entry thereof into the incoming store; a second counter operated by the exchange clock specifies the storage row into which the entry is to be made. Two other counters are likewise operated with the exchange clock, one counter accessing the address memories and the other counter causing the readout of PCM data by accessing the main store allocated to the outgoing four-wire time-division multiplex connection in the time-division multiplex switching center. Addresses supplied by a few of said counters via two OR circuits or addresses supplied by address memories as a result of the accessing of said address memories by another of said counters are applied to the main stores of the switching center.

SUMMARY OF THE INVENTION

It is an object of the invention to fashion the clock pulse supply and clock pulse routing in a PCM telecommunication network having less complex time-division multiplex switching centers than the type referenced above. This is particularly of importance if the components of the switching centers allocated to the individual four-wire time-division connections are constructed as modules to facilitate the expansion of switching systems or adapt them to existing systems.

The invention starts from a PCM time-division multiplex telecommunication network with a number of PCM time-division switching centers interconnected via four-wire time-division multiplex connections and having main stores allocated individually to each pair of conductors of the four-wire time-division multiplex connections for storing all elements of information incoming on or to be transferred over the time-division multiplex connection concerned, and associated with message time slots during a pulse frame determined by the duration of the sampling period of the time-division multiplex system. The system further has crosspoint elements for the space-division switching of the elements of information, as well as address memories which cause the space and time-division coordination of the operation of the crosspoint elements and of the storage locations of the main stores allocated to the individual message time slots, said PCM time-division multiplex telecommunication network preferably being provided with a greater number of switching time slots than the number of message time slots available on the four-wire time-division multiplex connections. In accordance with the invention, the foregoing and other objects are achieved in that in such a PCM time-division multiplex telecommunication network, the time-division multiplex switching centers for the supply of the operating pulses required in the course of a switching process for writing elements of information or communication-channel addresses into the main stores or address memories and for the readout thereof, insofar as they are not operating pulses according to which the elements of information appear on the incoming four-wire time-division connections in the switching centers, are each provided with a single clock generator whose clock frequency corresponds to the number of bit times for the elements of information which lie within a sampling period as a result of the number of switching time slots that may be increased, as necessary; a bit counter for counting the bit times appearing during a switching time slot; and a time-slot counter for counting the switching time slots, said time-slot counter normally being stepped up by a series of pulses taken at a counter stage of the bit counter, the repetition rate of which equals the rate of appearance of elements of information on the four-wire time-division multiplex connections, but which at one time is stopped for the duration of one bit time during each run of the bit counter and at another time moved backward one counter position during a bit time, the output signals thereof specifying switching time-slot addresses routed continually to the address memories. There is also provided in each time-division multiplex switching center a controlled OR circuit over which, as a function of designated counter positions of the bit counter, the switching time-slot addresses specified by the time slot counter, or the message time-slot addresses output by the address memories allocated to the main stores during the individual switching time slots, or the message time-slot addresses produced by a line counter stepped up on the four-wire time-division multiplex connections according to the rate of appearance of elements of information, are applied as access addresses to the main stores.

BRIEF DESCRIPTION OF THE DRAWING

The principles of the invention will be more readily understood by reference to the description of a preferred embodiment given hereinbelow in conjunction with the 2-figure drawing which is a schematic diagram of a PCM time-division multiplex telecommunication network constructed according to the invention.

DETAILED DESCRIPTION OF PREFERRED EMBODIMENT

Figure 1:
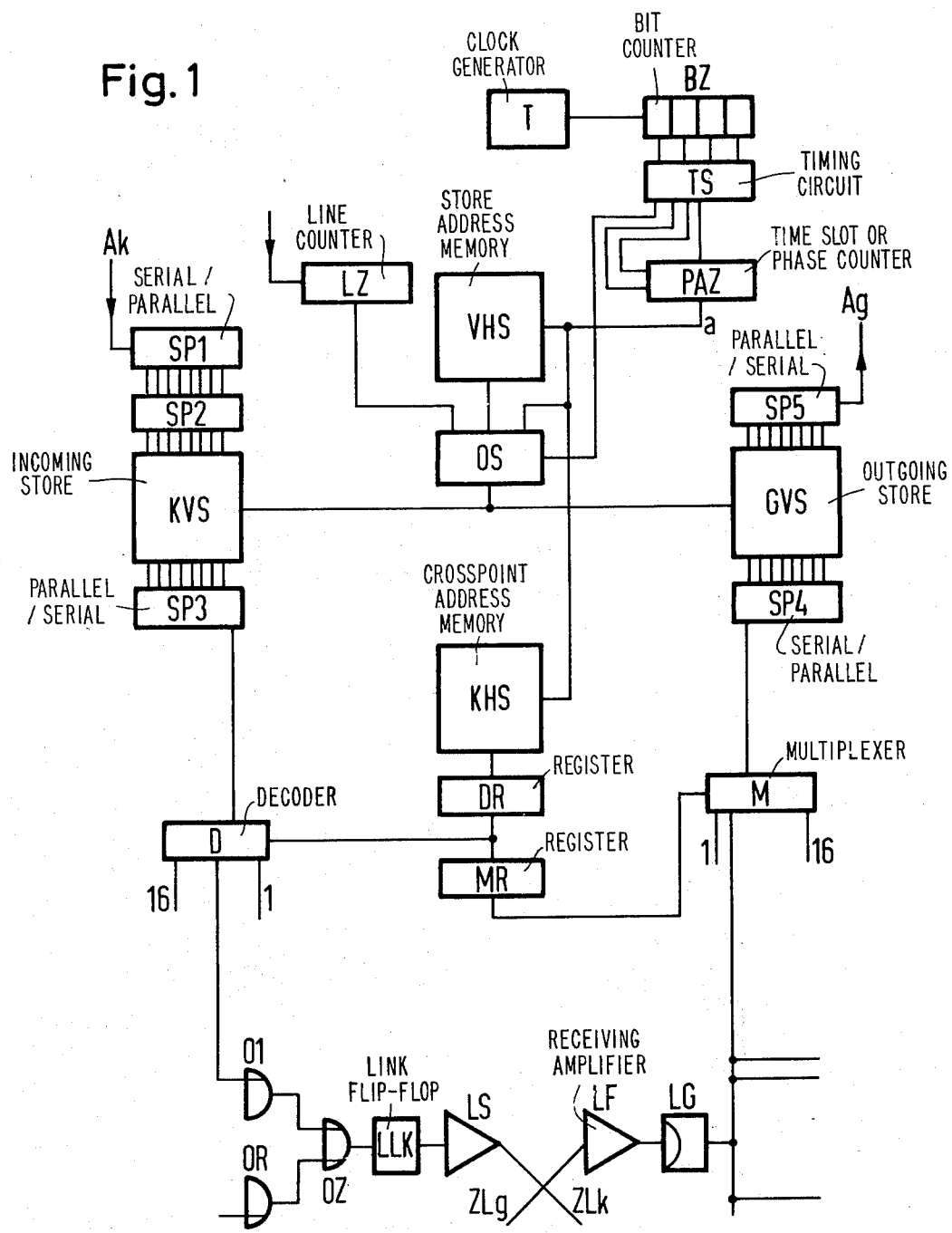
FIG. 1 shows the components of a PCM time-division multiplex switching center having the features proposed by the invention.

FIG. 1 shows the essential components of a PCM time-division multiplex switching center necessary for understanding the invention in conjunction with a single four-wire time-division multiplex line A represented by the incoming pair of conductors Ak and the outgoing pair Ag. It is assumed that the number of switching time slots is greater than the number of message time slots found on the four-wire time-division multiplex connections.

A store is allocated individually to each of said pairs, viz. the incoming store KVS to the incoming pair Ak and the outgoing store GVS to the outgoing pair Ag. Other storages are connected to each of said stores, each being capable of storing eight elements of information, that is to say, as many elements of information as are transmitted in a single message time slot on the PCM time-division multiplex connections. These are the converters, SP1, SP2 and SP3, which are connected to the incoming store KVS, and the converters SP4 and SP5, which are connected to the outgoing store GVS, the importance of which will be discussed in detail hereinbelow.

Crosspoint elements are used to switch the elements of information from the incoming store KVS to an outgoing store of another PCM time-division multiplex connections (not shown) associated with a connection to be set up, or to switch from the incoming store of the other PCM time-division multiplex connections to the outgoing store GVS of the pair Ag of the PCM time-division multiplex connections A. These crosspoint elements are represented here by a decoder D connected to the incoming store KVS or to the store SP3 connected thereto, as well as by a multiplexer M, which is connected to the outgoing store GVS or to the store SP4 connected thereto. The outlets of the decoder D, the number of which corresponds to the number of time-division multiplex connections combined into a group within the PCM switching center plus an output for signalling (of which only one is illustrated in the drawing) are connected to the inlets of another of the OR circuits 01 to 02, the remaining inlets thereof being connected to outlets of other decoders. The outlets of these OR circuits are combined over another OR circuit OZ, whose outlet runs to a link flip-flop LLK. The transmission path runs from there via a transmitter amplifier LS to an incoming link Zlk, over which a further connection runs to the outgoing pair of a four-wire trunk associated with the relevant connection. The latter connection runs via switching components, as shown in connection with the outgoing pair of the PCM connection Ag., viz. over a receiving amplifier LF and a power gate LG, to one of the inlets of a multiplexer M representing a crosspoint, whose outlet reaches a store corresponding to the store GVS via a store corresponding to the single slot store SP4.

For the space and time-division coordination of the operation of the crosspoint elements, viz. the decoder D and the multiplexer M, and the store locations of the stores allocated to the individual message time slots, there are provided address memories which are assigned to each PCM time-division multiplex connection. For the time-division multiplex connection A, which comprises both incoming pair Ak and outgoing pair Ag, these are the store address memory VHS, which serves as a means to access the incoming store KVS and the outgoing store GVS, as well as the crosspoint-address memory KHS, which accesses the crosspoints via a register DR allocated to the decoder D, and a register MR allocated to the multiplexer M. The importance of these registers will be discussed hereinbelow. The aforesaid coordination through the address memories occurs such that a larger number of switching time slots are provided than the number of message time slots appearing on the time-division multiplex connections.

The operating pulses required in the course of a switching operation, which will be explained hereinbelow, for writing elements of information or message channel addresses into the stores or holding sets and for the readout thereof are derived from a single clock generator insofar as they are not operating pulses according to which the elements of information appear on pairs of incoming conductors in the PCM switching center.

In the practical example illustrating the provision of 64 switching time slots on the link connections of the PCM switching centers, this clock generator supplies pulses at a repetition rate of 4,096 MHz. According to the invention, there is also provided a bit counter BZ having four stages, which is stepped up by the clock generator T and is used to count the 8 bit times appearing repeatedly within the 64 switching time slots.

A time slot counter PAZ is likewise provided within a PCM time-division multiplex switching center constructed according to the invention. This time slot counter is used to supply the addresses of the 64 switching time slots. Normally, one steps up from a sequence of pulses taken at a counter stage of the bit counter BZ, whose repetition rate corresponds to the rate of appearance of elements of information on the four-wire time-division multiplex connections, and which, according to the conditions in a conventional PCM communication network, amounts to 2,048 MHz. However, at one time during each run of the bit counter BZ in the course of a bit time the time slot counter PAZ is prevented from counting. Moreover, said counter is moved backward one counter position during each run of the bit counter BZ at another bit time. The time intervals at which this stopping or backspacing of the time slot counter PAZ occurs within a period of the bit counter BZ is made dependent on specified output signal combinations at the individual stages of the bit counter. This is shown in FIG. 1 by the insertion of a timing circuit TS which receives the output signals of the bit counter and transmits them to the time slot counter PAZ in the form of relay signals, backspacing signals and stop signals.

As shown in the drawing, the switching time slot addresses produced by the time slot counter PAZ are continuously applied at the store holding input VHS via the output a of the time slot counter PAZ and at the crosspoint memory KHS input.

According to another feature of the invention, a controlled OR-circuit OS is provided in the time-division multiplex switching center for each four-wire time-division multiplex connection. Either the switching time slot address supplied via said OR circuit or the message time-slot address output by the store VHS, or the message time slot address produced by a line counter LZ is transmitted to the incoming store KVS or to the outgoing store GVS. The decision as to which of said addresses routed to the OR circuit is to be transmitted depends likewise on the counter position of the bit counter BZ. This is shown by the line connecting the time circuit TS with the OR-circuit OS.

Figure 2:
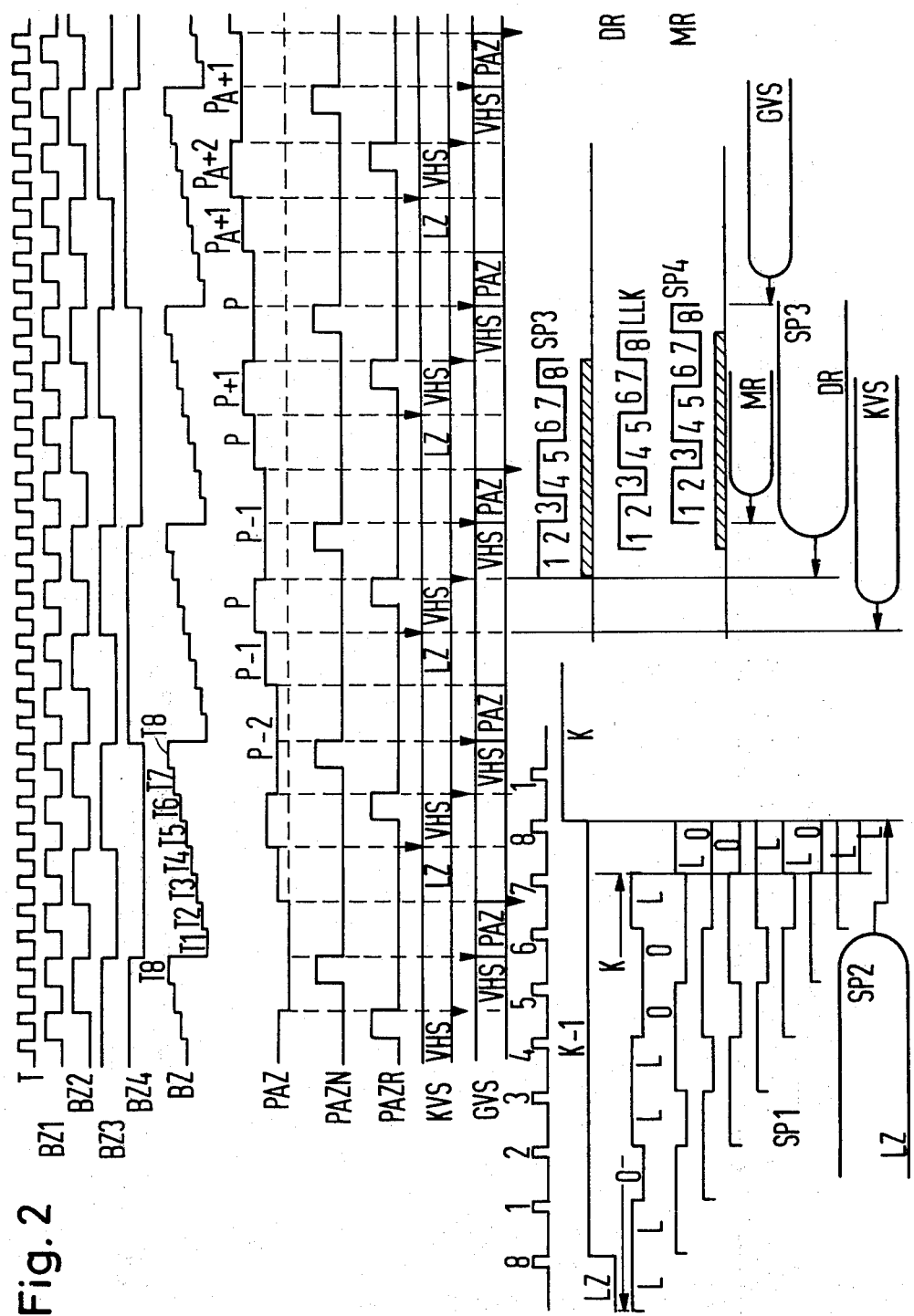
FIG. 2 shows a clock pulse diagram, according to which the switching processes are executed when employing the PCM time-division multiplex switching center shown in FIG. 1.

The principles of the invention will be more readily understood by reference to the description of a preferred embodiment given hereinbelow in conjunction with the pulse diagram of FIG. 2.

The pulse train generated by a clock generator T is shown in the first row T of said pulse diagram, such as it is individually allocated in each PCM time-division multiplex switching center to the PCM time-division multiplex connections. As mentioned above, the repetition rate of said pulse train amounts in the example to 4,096 MHz.

The next four rows BZ1 to BZ4 of the pulse diagram show the time-dependent behavior of the pulse trains appearing at the four outlets of the bit counter BZ as stepped by the clock generator T. The pulse train appearing at the outlet of the first counter stage has a repetition rate of 2,048 MHz, and, as mentioned above, is used to step the time slot counter PAZ.

The next row BZ in the pulse diagram shows the time sequence of the eight different counter positions of the bit counter BZ.

In the line PAZ lying therebelow is shown the time sequence of the counter positions of the time slot counter PAZ. In the two rows PAZN and PAZR lying therebelow are shown the timing sequences during which, in the case of PAZN, the time slot counter is prevented from counting further, while in the case of PAZR the time slot counter is counted backward one counter position. As shown by a comparison with the row BZ, the pulses PAZN that cause the stopping of the time slot counter PAZ always occur in conjunction with the last counter position T8 of the bit counter BZ. As shown by a corresponding comparison, the pulses PAZR causing the backspacing coincide in each case with the appearance of the sixth counter position of the bit counter BZ.

In the rows KVS and GVS are indicated the time intervals at which accessing of the two stores is effective. At the same time an entry is made from where said accessing takes place, viz. either from the line counter LZ or from the store holding set VHS or from the time slot counter PAZ. In addition, one can see from the arrows in the drawing if said accessing results in a writing into said stores or a readout therefrom.

A switching example is given hereinbelow relating to operations that involve the incoming PCM time-division multiplex pair Ak in the switching center and the outgoing pair Ag in said PCM time-division multiplex switching center and associated with the same PCM time-division multiplex connections, it being assumed that in the time slot K the elements of information 1101001 come in on the pair Ak and that the space-division switching occurs during the switching time slot P of the 64 switching time slots concerned. It has also been assumed that the message time slot K appears, that is to say, that the line counter LZ specifies its address, when the time slot counter PAZ is just supplying the address of the switching time slot P-1. Said allocation, which is also shown by the comparison of the rows PAZ and KVS, is arbitrary and is solely used to facilitate orientation in the clock pulse diagram.

As mentioned hereinabove, the address of time slots (specified by the line counter LZ) in which the elements of information on the PCM time-division multiplex connections are transmitted is effective for accessing the incoming store KVS if the bit counter BZ takes the third and fourth counter position of its counter cycle (Cf. rows BZ and KVS). The accessing of the incoming store KVS with the message time slot address (here, the address of the message time slot K) results in the elements of information being entered in series from the pair Ak into the store SP1 and transferred in parallel therefrom to the store SP2 connected thereto. They are thereafter written into the row of the incoming store KVS specified by the line counter and allocated to the message time slot K. As shown by the line connections in FIG. 1 outgoing from the outlet of the controlled OR-circuit OS, the outgoing store GVS, too, is accessed at the same time with the address of the message time slot K. However, at these intervals T3 and T4 the accessing of the outgoing store GVS produces no results.

As mentioned hereinabove, the switching time slot P must be suitable for relay of the information of the time slot K stored in the incoming store KVS. When it is seized, the address of the time slot K is entered into the address memory VHS allocated to the stores, that is to say, into the store row allocated to the switching time slot P, said address memory VHS having 64 store rows to conform with the number of available switching time slots. Now, when the address of the switching time slot P is specified by the time slot counter PAZ, the message time slot address K written in the row allocated to the switching time slot is read out because of the accessing of the address memories and, thereby, of the address memory VHS assigned to the stores. If this readout takes place during the intervals T5 and T6 defined by the bit counter BZ, the message time slot address is applied by the address memory VHS to the incoming store KVS via the controlled OR-circuit OS for accessing (compare this with the rows PAZ and KVS of the pulse diagram). The result of this accessing of the incoming store KVS is that the information units stored in the row with the address KK are transferred in parallel to the store SP3 following the incoming store.

With the seizure of the switchng time slot P there has also been entered into the address memory KHS allocated to the crosspoints (i.e., into the store row allocated to the switching time slot P) the address of the crosspoints causing a space-division switching to the link ZL to be used for the connection in question. Coincident with the aforesaid output of a message time slot address by the address memory VHS allocated to the stores, the crosspoint address memory KHS likewise transmits to the register DR inserted thereafter the crosspoint addresses specified for switching, time slot so that said message time slot address is available for accessing the crosspoints for 8 bit times. Thus, with the subsequent bit time, the first element of information of the message time slot K can be transferred to the link flip-flop LLK thereafter the serial transfer to the link ZL can take place. With the acceptance of the first element of information by the link flip-flop LLK, the crosspoint addresses governing the switching time slot P travel from the register DR to the register MR also, so that they are likewise available to the cross points for 8 bit times registered by the multiplexer M. The aforesaid time lag in the transfer of crosspoint addresses to the register DR as compared with the transfer of crosspoint addresses to the register MR is necessary since, due to the link flip-flop LLK, the transfer of information on the links ZL is likewise delayed by one bit time. After the crosspoint addresses for the crosspoints represented by the multiplexer M are available in the register MR, the units of information originating on the line ZLg from an incoming store, which is allocated to the other PCM time-division multiplex connection associated with the relevant connection (not shown), are transferred serially to the stores SP4. These time-dependent relations behind the crosspoint selection and serial transfer of the units of information are likewise apparent from the pulse diagram.

During the time that the serial readout from the converter SP3 or the serial read-in to the converter SP4 takes place, the time slot PAZ has in the meantime taken the counter position corresponding to the subsequent switching time slot P+1, as shown in the pulse diagram, and can thus perform the appropriate switching operations for another message time slot.

However, owing to the mode of operation of the phase counter PAZ according to the invention, after the elements of information of the time slot K, entered serially, are completely retained in the store SP4, said time slot counter PAZ resupplies the address of the switching time slot P, so that in the address memories the row corresponding to said switching time slot is again selected. Consequently, during the bit times T7 and T8 the address memory VHS for the stores transfers the address of the message time slot K over the controlled OR circuit and said address is presently operative as a trigger address for the outgoing store GVS, so that the content of the store SP4 can be input to the store row allocated to the message time slot K.

The transfer of the information in the row of the outgoing store allocated to the time slot K to the store SP5 connected after said store occurs as a result of periodic accessing by the time slot counter PAZ. In the example shown, said counter, as mentioned hereinabove, is capable of producing with its 6 counter stages the addresses of 64 switching time slots. However, for the readout operation only the five most significant positions of the addresses yielded are taken into consideration, so that only 32 distinguishable addresses affect the read-out operation and the presence of only 32 message time slots is taken into account. The readout from the outgoing store GVS, i.e., the transfer of information to the following store SP5 occurs in the example illustrated in the pulse diagram at the counter position PA+1. However, due to the non-consideration of the least significant counter stage, an address is supplied which is not distinguishable from the one in the counter position P of the phase counter PAZ, so that the allocation to the address of the time slot K is established even at this counter position. Since, as explained hereinabove, the addresses supplied by the time slot counter PAZ for the outgoing stores GVS are only operative during the bit times T1 and T2 determined by the bit counter BZ, the transfer to the store SP5, as shown in the pulse diagram, does not take place when the counter position PA+1 is set for the first time, but only 8 bit times later, when the counter position PA+1 reappears due to the temporary backspacing of the time slot counter PAZ. The elements of information travel in series from the store SP5 to the outgoing pair Ag of the PCM time-division multiplex connection A.

The above description is of a preferred embodiment of the invention, various modifications of which may appear to those skilled in the art while not departing from the spirit and scope of the invention which is intended to be defined only by the appended claim.

I claim:

1. A PCM time-division multiplex telecommunication network having a plurality of PCM time-division multiplex switching centers interconnected over four-wire time-division multiplex connections, each of said PCM time-division multiplex switching centers having stores assigned individually to each pair of conductors of the four-wire time-division multiplex connections for storing all elements of information associated with message time slots during a pulse frame and arriving on or to be transferred over the time-division multiplex connection concerned, said pulse frame being determined by the duration of the sampling period of the time-division multiplex system, said network further having crosspoint elements for the space-division switching of the message time slots as well as address memories which are used to accomplish the space- and time-division coordination of the operation of the crosspoint elements and of the store allocations of the stores assigned to the individual message time slots, said PCM time-division multiplex telecommunication network being provided with a number of switching time slots larger than the number of said message time slots available on the four-wire time-division multiplex connections, characterized in that in the time-division multiplex switching centers means are provided for supplying the operating pulses required for a four-wire time-division multiplex connection in the course of a switching operation for the writing of elements of information or communication-channel addresses into the stores or address memories (VHS,KHS) and for the readout thereof, comprising a single clock generator whose clock frequency corresponds to the number of bit times for elements of information which lie within a sampling period, a bit counter (BZ) having designated counter positions for counting the bit times appearing during one of said switching time slots, and a time slot counter for uniquely representing by count the number of said switching time slots, said time slot counter being normally stepped by a series of pulses collected at a counter stage of said bit counter the repetition rate of said pulses equalling the rate of appearance of elements of information on the four-wire time-division multiplex connections stepped during each run of the bit counter during each of said pulse frames for the duration of one bit time, the counter being moved backward one counter position during another of said bit times as uniquely determined by one of said counter positions of said bit counter, the output signals of said bit counter specifying switching time slot addresses which are routed continually to the address memories and there being provided in each switching center for each four-wire time-division multiplex connection a controlled OR circuit over which the switching time slot addresses specified by the time slot counter or the message time slot addresses output by the address memories allocated to the stores during the individual switching time slots, or the message time slot addresses produced by a line counter according to the rate of appearance of elements of information, are applied as access addresses for the stores as a function of designated counter positions of the bit counter.

* * * * *